(12) United States Patent
Sanchez et al.

(10) Patent No.: US 11,595,420 B2
(45) Date of Patent: Feb. 28, 2023

(54) SYSTEMS AND METHODS FOR PROTECTING AGAINST MISLEADING CLICKS ON WEBSITES

(71) Applicant: NortonLifeLock Inc., Tempe, AZ (US)

(72) Inventors: Iskander Sanchez, Antibes (FR); David Silva, Dublin (IE)

(73) Assignee: Gen Digital Inc., Tempe, AZ (US)

( * ) Notice: Subject to any disclaimer, the term of this patent is extended or adjusted under 35 U.S.C. 154(b) by 261 days.

(21) Appl. No.: 16/991,985

(22) Filed: Aug. 12, 2020

(65) Prior Publication Data

US 2022/0053009 A1 Feb. 17, 2022

(51) Int. Cl.
*G06F 16/955* (2019.01)
*G06F 9/54* (2006.01)
*H04L 9/40* (2022.01)

(52) U.S. Cl.
CPC ...... *H04L 63/1425* (2013.01); *G06F 16/9558* (2019.01); *G06F 16/9566* (2019.01); *H04L 63/1416* (2013.01)

(58) Field of Classification Search
USPC .......................................................... 726/23
See application file for complete search history.

(56) References Cited

U.S. PATENT DOCUMENTS

| 2008/0177994 | A1* | 7/2008 | Mayer ............... | G06F 16/00 |
| | | | | 709/224 |
| 2011/0161260 | A1* | 6/2011 | Burges .............. | G06F 16/9566 |
| | | | | 707/711 |
| 2012/0102545 | A1* | 4/2012 | Carter, III .......... | G06F 21/51 |
| | | | | 707/769 |
| 2013/0110648 | A1* | 5/2013 | Raab ................. | G06Q 30/0241 |
| | | | | 705/14.73 |
| 2014/0172552 | A1* | 6/2014 | Raab ................. | G06Q 30/0248 |
| | | | | 705/14.47 |
| 2014/0278947 | A1* | 9/2014 | Raab ................. | G06Q 30/0248 |
| | | | | 705/14.47 |

(Continued)

FOREIGN PATENT DOCUMENTS

WO 2015/007231 A1 1/2015

OTHER PUBLICATIONS

International Search Report and Written Opinion received for PCT Application Serial No. PCT/US2021/045574 dated Nov. 4, 2021, 13 pages.

*Primary Examiner* — Jude Jean Gilles
(74) *Attorney, Agent, or Firm* — Greenberg Traurig, LLP (57) ABSTRACT

The disclosed computer-implemented method for protecting against misleading clicks on websites may include (i) detecting a user click event on a uniform resource locator (URL) for navigating to a website during a web browsing session, (ii) analyzing the user click event to identify expected domain behavior associated with navigating to the website based on the URL, (iii) determining, based on the analysis, that the user click event deviates from the expected domain behavior associated with navigating to the website based on the URL, and (iv) performing a security action that protects against potentially malicious activity caused by the user click event deviating from the expected domain behavior associated with navigating to the website based on the URL. Various other methods, systems, and computer-readable media are also disclosed.

15 Claims, 7 Drawing Sheets

(56) References Cited

U.S. PATENT DOCUMENTS

| | | | |
|---|---|---|---|
| 2014/0324573 A1* | 10/2014 | Raab | G06Q 30/0241 |
| | | | 705/14.47 |
| 2014/0358678 A1* | 12/2014 | Raab | G06Q 30/0248 |
| | | | 705/14.47 |
| 2015/0032533 A1* | 1/2015 | Raab | G06Q 30/0248 |
| | | | 705/14.47 |
| 2015/0288716 A1 | 10/2015 | Emigh et al. | |
| 2018/0039791 A1* | 2/2018 | Beye | G06Q 10/06315 |
| 2018/0039924 A1* | 2/2018 | Beye | H04L 67/306 |
| 2018/0039989 A1* | 2/2018 | Beye | G06Q 30/0601 |
| 2019/0230070 A1* | 7/2019 | Isaacson | H04W 12/084 |
| 2019/0281059 A1* | 9/2019 | Chittampally | G06F 16/953 |
| 2019/0306137 A1* | 10/2019 | Isaacson | G07F 9/006 |
| 2020/0382480 A1* | 12/2020 | Isaacson | G06Q 30/0641 |
| 2021/0248203 A1* | 8/2021 | Li | G06N 20/00 |
| 2022/0053009 A1* | 2/2022 | Sanchez | G06F 16/9558 |

\* cited by examiner

SYSTEMS AND METHODS FOR PROTECTING AGAINST MISLEADING CLICKS ON WEBSITES

BACKGROUND

Consumer and enterprise computer users may often click on a number of universal resource locators (URLs) or links pointing to different websites during a single web browsing session. In some instances, a website link may be disguised as a legitimate URL pointing to a known/safe domain by a malicious actor but which, in actuality, points to a different domain for a dangerous website intended to expose users to various threats including malware attacks, phishing attacks, etc.

Conventional security software often provides web browsing protection based on blocking certain scripts or websites only when a user accesses them in a web browser. However, conventional security software offers no protection or an indication of what to expect when performing clicks for accessing potentially harmful websites.

SUMMARY

As will be described in greater detail below, the present disclosure describes various systems and methods for protecting against misleading clicks on websites.

In one example, a method for protecting against misleading clicks on websites may include (i) detecting, by one or more computing devices, a user click event on a uniform resource locator (URL) for navigating to a website during a web browsing session, (ii) analyzing, by the one or more computing devices, the user click event to identify expected domain behavior associated with navigating to the website based on the URL, (iii) determining, by the one or more computing devices and based on the analysis, that the user click event deviates from the expected domain behavior associated with navigating to the website based on the URL, and (iv) performing, by the one or more computing devices, a security action that protects against potentially malicious activity caused by the user click event deviating from the expected domain behavior associated with navigating to the website based on the URL.

In some examples, the user click event may be detected by (i) monitoring a website for the user click event during the web browsing session and (ii) extracting context information for the user click event. The context information may include information describing a domain where the user click event occurred and an expected domain for a destination of the user click event.

In some embodiments, the user click event may be analyzed by (i) detecting a hyperlink reference to the URL (e.g., an href domain value) in a browser for displaying the website during the browsing session, (ii) determining, based on the hyperlink reference, whether a click contract describing a domain behavior associated with navigating to the website has been broken or fulfilled, and (iii) identifying the domain behavior as the expected domain behavior upon determining that the click contract has been fulfilled. In some examples, determining whether click contract has been broken or fulfilled may include (i) determining that the click contract has been broken when a navigation to a target domain destination pointed to by the URL lands in a different domain destination (which include a web tracker domain) in response to the user click event, (ii) determining that the click contract has been broken when the navigation to the target domain destination is redirected to another domain destination (which may include a web tracker domain) prior to landing in the target domain destination in response to the user click event, (iii) determining that the click contract has been broken when a navigation to a target domain destination protected by a secure protocol lands in an unprotected domain destination in response to the user click event, or (iv) determining that the click contract has been broken when the navigation to the target domain destination protected by the secure protocol is redirected to the unprotected domain destination prior to landing in the target destination protected by the secure protocol in response to the user click event.

In some examples, the security action may include blocking the navigating to the website responsive to the user click event. The security action may additionally include (i) presenting a selection of user security options in response to blocking the navigating to the website responsive to the user click event and (ii) receiving a selection of at least one of the user security options. In some embodiments, the user security options may include (i) allowing subsequent user click events on the URL to navigate to the website during the web browsing session, (ii) trusting a domain associated with the website, and (iii) disabling a browser extension utilized for detecting the user click event.

In one embodiment, a system for protecting against misleading clicks on websites may include at least one physical processor and physical memory that includes computer-executable instructions and one or more modules that, when executed by the physical processor, cause the physical processor to (i) detect, by a detection module, a user click event on a uniform resource locator (URL) for navigating to a website during a web browsing session, (ii) analyze, by an analysis module, the user click event to identify expected domain behavior associated with navigating to the website based on the URL, (iii) determine, by a determining module and based on the analysis, that the user click event deviates from the expected domain behavior associated with navigating to the website based on the URL, and (iv) perform, by a security module, a security action that protects against potentially malicious activity caused by the user click event deviating from the expected domain behavior associated with navigating to the website based on the URL.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect a user click event on a uniform resource locator (URL) for navigating to a website during a web browsing session, (ii) analyze the user click event to identify expected domain behavior associated with navigating to the website based on the URL, (iii) determine, based on the analysis, that the user click event deviates from the expected domain behavior associated with navigating to the website based on the URL, and (iv) perform a security action that protects against potentially malicious activity caused by the user click event deviating from the expected domain behavior associated with navigating to the website based on the URL.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting against misleading clicks on websites. As will be described in greater detail below, the systems and methods described herein may utilize a browser extension to monitor what occurs when a URL for navigating to a website is clicked (i.e., a user click event) in a browser to determine if a click contract corresponding to one or more rules of expected domain behavior has been broken. Upon determining a click contract has been broken based on unexpected domain behavior, the web browser extension may be configured to block the user click event by intercepting the browser navigation/redirection and notify the user that a click contract rule has been broken. By utilizing the browser extension in this way, the systems and methods described herein may inform and protect users from potentially unsecure, harmful, and/or tracking click events during web browsing sessions prior to landing on click destinations (e.g., websites) which may threaten user security or the security of user computing devices.

In addition, the systems and methods described herein may improve the field of data privacy by preventing navigation to potentially harmful websites containing code designed to obtain sensitive information from users based on identifying unexpected click behavior during web browsing sessions. Moreover, the systems and methods described herein may improve the field of computing device security by preventing navigation to potentially harmful websites containing code designed to cause damage to a computing device based on identifying unexpected click behavior during web browsing sessions.

Figure 1:
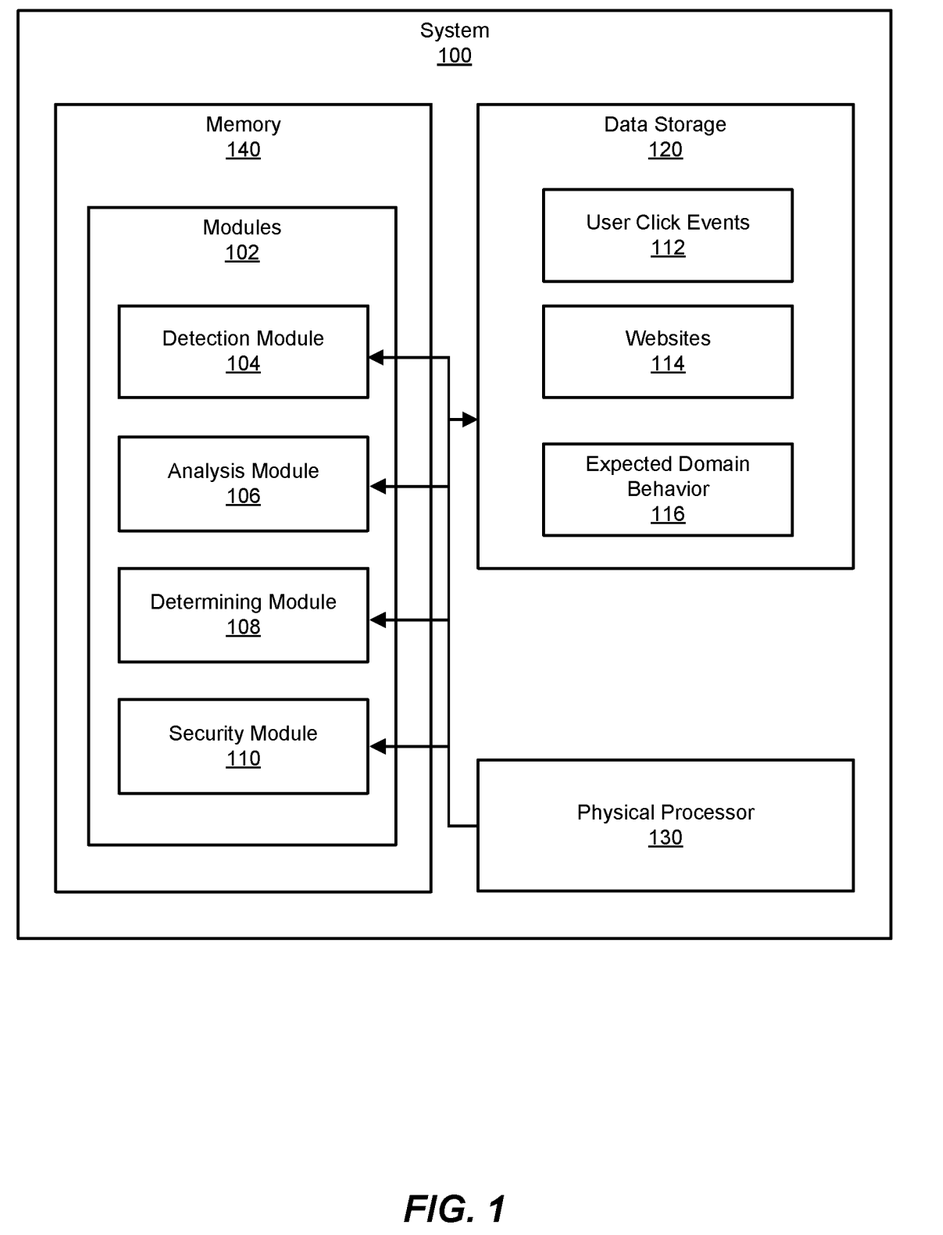
FIG. 1 is a block diagram of an example system for protecting against misleading clicks on websites.
Figure 2:
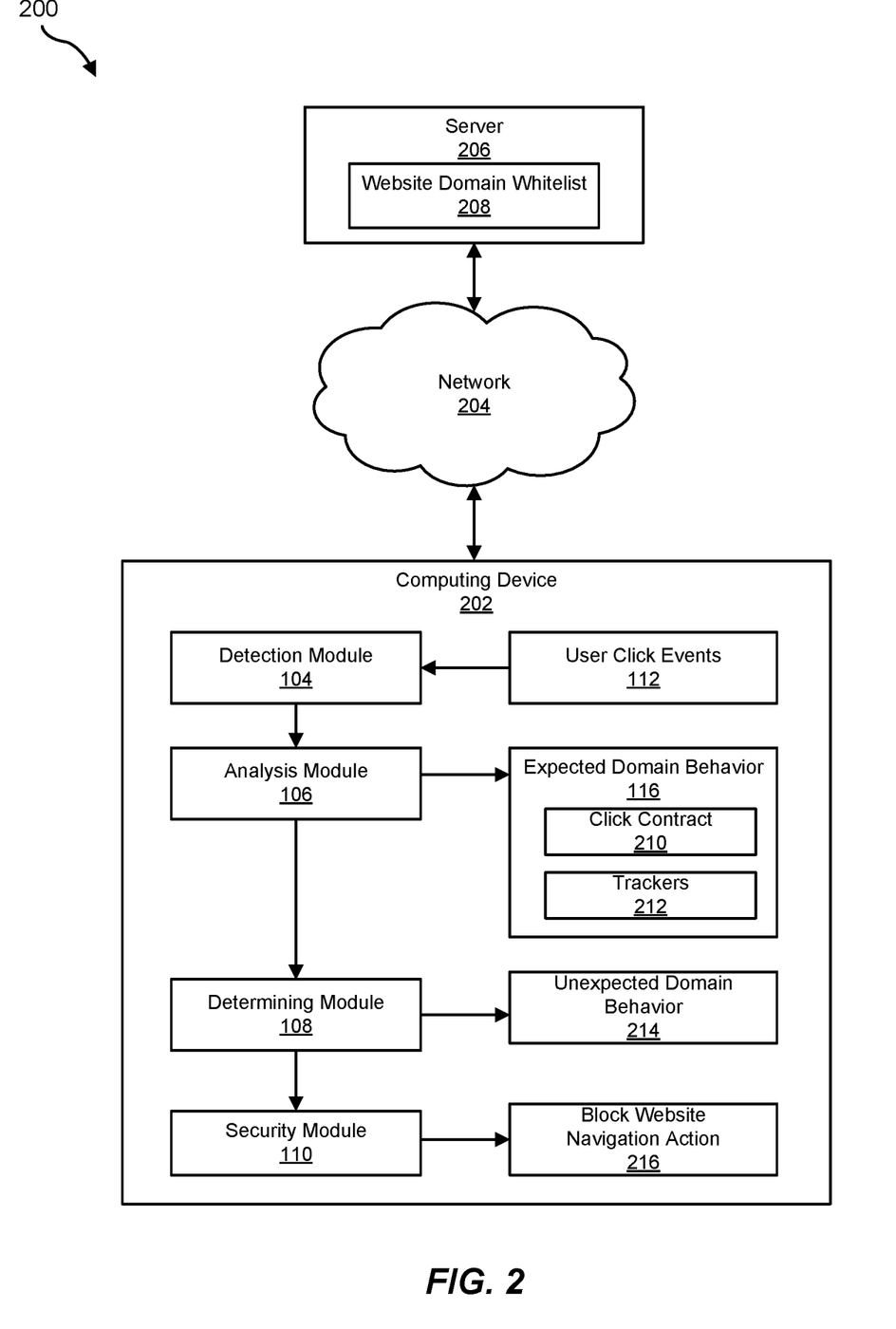
FIG. 2 is a block diagram of an additional example system for protecting against misleading clicks on websites.

The following will provide, with reference to FIGS. 1-2, detailed descriptions of example systems for protecting against misleading clicks on websites. Detailed descriptions of corresponding computer-implemented methods will also be provided in connection with FIGS. 3-4. In addition, a detailed description of a website showing example security actions in an example system for protecting against misleading clicks, will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for protecting against misleading clicks on websites. As illustrated in this figure, example system 100 may include one or more modules 102 for performing one or more tasks. For example, and as will be explained in greater detail below, example system 100 may include a detection module 104 that detects user click events 112 on a uniform resource locator (URL) for navigating to a website 114 during a web browsing session. Example system 100 may additionally include an analysis module 106 that analyzes a user click event 112 to identify expected domain behavior 116 associated with navigating to the website based on the URL. Example system 100 may also include a determining module 108 that determines, based on the analysis performed by analysis module 106, that a user click event 112 deviates from expected domain behavior 116 associated with navigating to the website based on the URL. Example system 100 may additionally include a security module 110 that performs a security action that protects against potentially malicious activity caused by a user click event 112 deviating from expected domain behavior 116. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting against misleading clicks on websites. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store user click events 112, websites 114, and expected domain behavior 116 as data on system 100.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. In some examples, all or a portion of the functionality of modules 102 may be incorporated into a single software module (i.e., a browser extension) stored on computing device 202. As will be described in greater detail below, one or more of modules 102 from FIG. 1 may, when executed by at least one processor of computing device 202 and/or server 206, enable computing device 202 and/or server 206 to protect against misleading clicks on websites.

For example, detection module 104 may detect a user click event 112 on a URL for navigating to a website 114 during a web browsing session. Next, analysis module 106 may analyze a user click event 112 to identify expected domain behavior 116 (based on compliance with a click contract 210 and the presence of any (web) trackers 212) associated with navigating to a website 114. Then, determining module 108 may determine, based on the analysis performed by analysis module 106, that a user click event 112 deviates from expected domain behavior 116 associated with navigating to the website based on the URL. Finally, security module 110 may perform a security action (such as a block website navigation action 216) that protects against potentially malicious activity caused by a user click event 112 deviating from expected domain behavior 116 by exhibiting unexpected domain behavior 214.

Computing device 202 generally represents any type or form of computing device capable of reading computer-executable instructions. In some examples, computing device 202 may be an endpoint device running client-side web browser software including a browser extension for detecting and protecting against misleading clicks on websites. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading and/or executing computer-readable instructions. In some examples, server 206 may be a backend server that provides a website domain whitelist 208 for identifying highly accessed websites that may exhibit some unexpected (but not unsafe) domain behavior in response to user click events 112 during a web browsing session. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
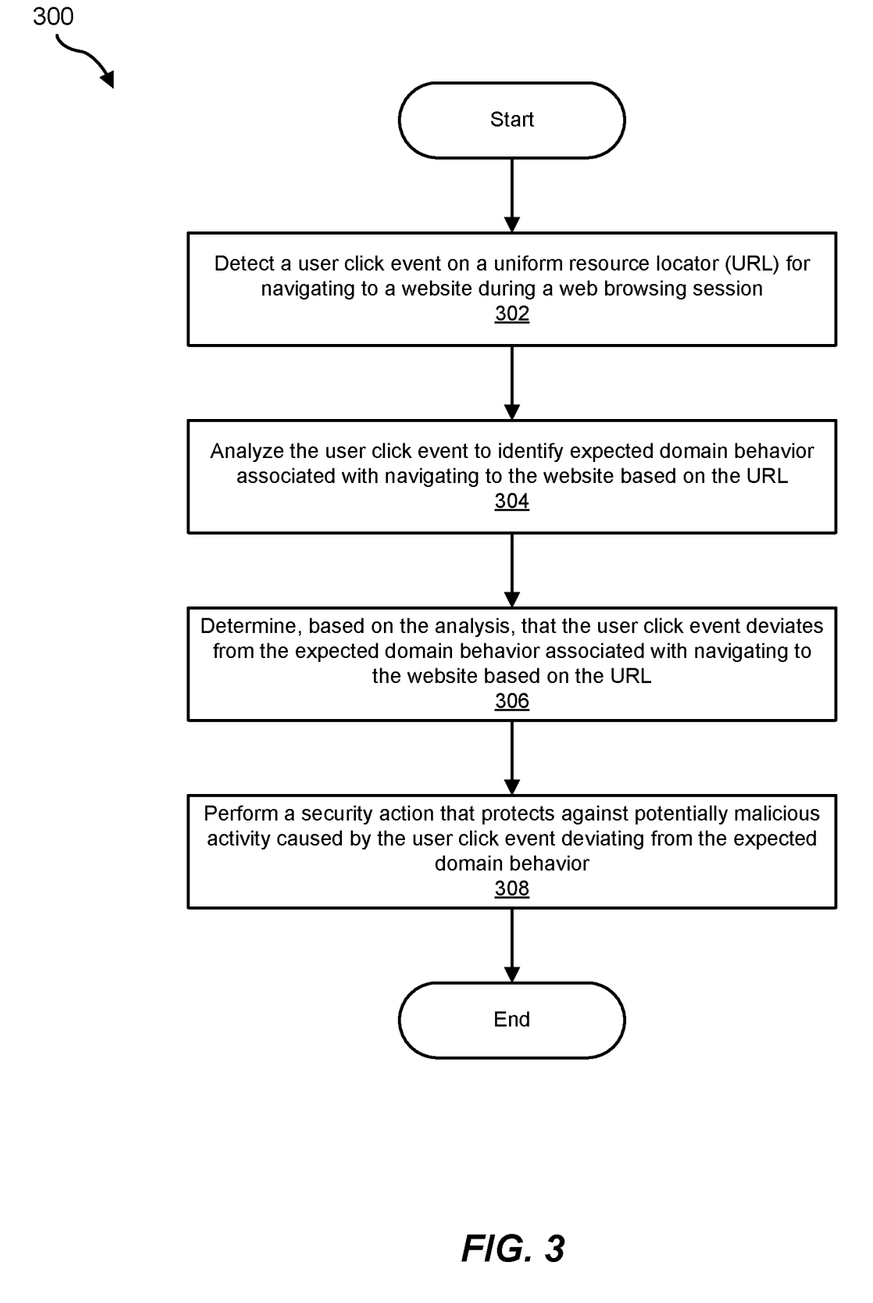
FIG. 3 is a flow diagram of an example method for protecting against misleading clicks on websites.

FIG. 3 is a flow diagram of an example computer-implemented method 300 for protecting against misleading clicks on websites. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect a user click event on a URL for navigating to a website during a web browsing session. For example, detection module 104 may, as part of computing device 202 in FIG. 2, detect a user click event 112 on a URL for navigating to a website 114 during a web browsing session in a browser.

The term "user click events," as used herein, generally refers to any user input (e.g., mouse input, keyboard input, touchscreen input, voice input, etc.) for selecting and/or interacting with a URL (e.g., a web link) on a browser website. In some examples, user click events may include user inputs for selecting a web link on a website to navigate to a different website.

Detection module 104 may detect a user click event 112 in a variety of ways. In some examples, detection module 104 may be configured to monitor a website for a user click event 112 during a web browsing session and then extract associated context information. In one embodiment, detection module 104 may monitor a website by utilizing a document object module (DOM) mutation observer that monitors actions occurring as a result of user action in the Hypertext Markup language (HTML) utilized in documents displayed in a web browser (e.g., webpages). For example, detection module 104 may utilize a DOM mutation observer to constantly monitor a webpage for a website and observe any modifications within its structure (such as inserted nodes, changes attributes, etc.). By performing monitoring in this way, all elements on a webpage are able to be utilized to listen for user click events 112 and trigger a background rules evaluation process. Furthermore, the DOM mutation observer may be utilized to listen to all of multiple user click events 112 (i.e., clicks) and "mouse down events" (i.e., browser events that detect a mouse click on a web link), extract the context of the user clicks, and inform a back-end run-time (i.e., a background script of a browser extension) that a click has occurred. In some embodiments, the extracted context information may include information describing a domain where a user click event 112 has occurred and extracting an expected domain for a click destination. As will be described in greater detail below, the information describing the domain where a user click event 112 has occurred and the expected domain for the destination may be utilized to evaluate whether or not click contract 210 has been broken.

At step 304 one or more of the systems described herein may analyze the user click event detected at step 302 to identify expected domain behavior associated with navigating to the website based on the URL. For example, analysis module 106 may, as part of computing device 202 in FIG. 2, analyze a user click event 112 to identify expected domain behavior 116 associated with navigating to a website 114. Analysis module 106 may analyze a user click event 112 in a variety of ways which will now be described in conjunction with FIG. 4.

Figure 4:
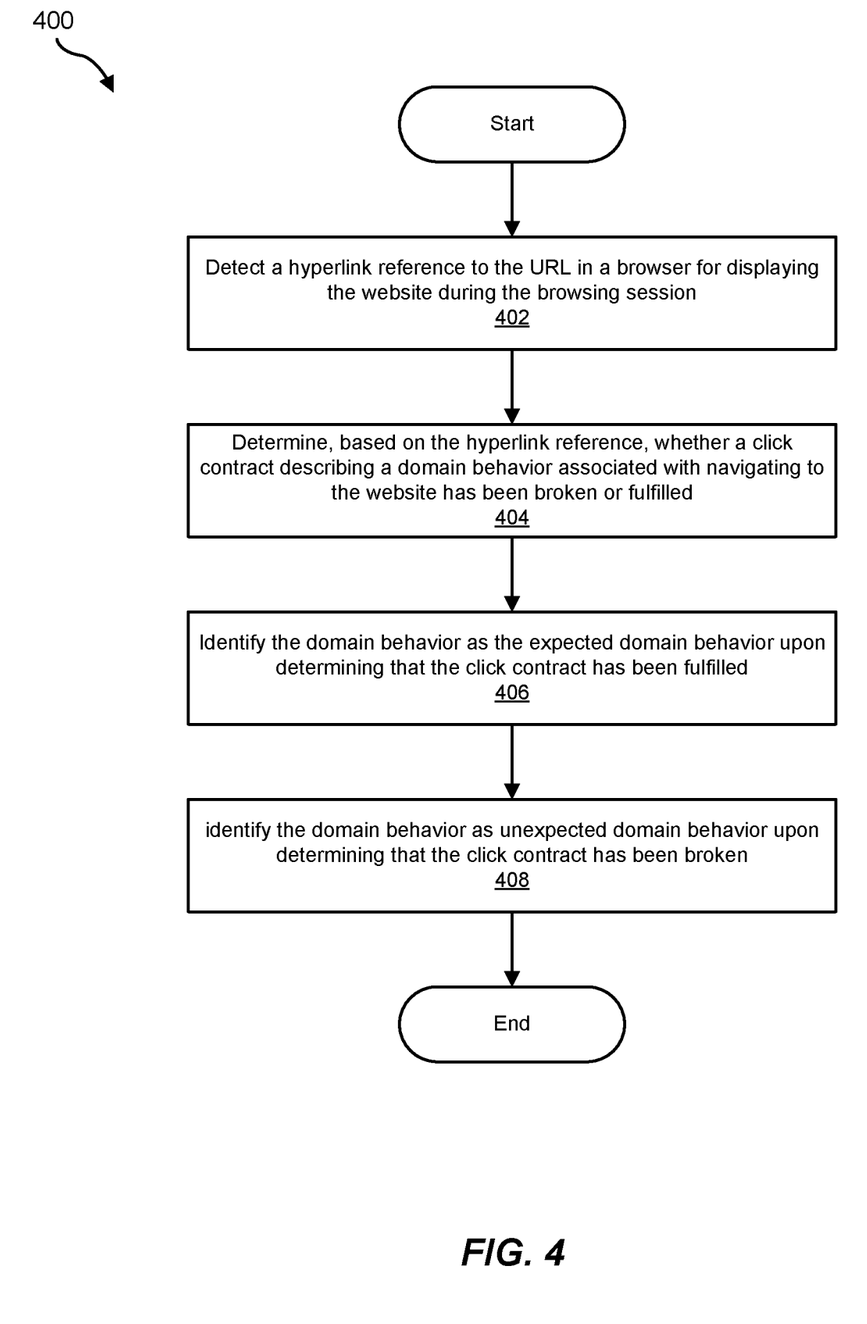
FIG. 4 is a flow diagram of an example method for analyzing user click events to identify unexpected domain behavior.

FIG. 4 is a flow diagram of an example computer-implemented method 400 for analyzing user click events to identify unexpected domain behavior. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may detect a hyperlink reference to the URL receiving a user click event in a browser for displaying a website during the browsing session. For example, analysis module 106 may, as part of computing device 202 in FIG. 2, detect a hyperlink reference to the URL receiving a user click event 112 in a browser for displaying a website 114 during the browsing session.

Analysis module 106 may detect a hyperlink reference to the URL receiving a user click event 112 in a browser for displaying a website 114, in a variety of ways. In some embodiments, analysis module 106 may detect an href domain value shown in the browser and the specific value indicated in the text of the URL. If no specific value is indicated, no external access from the URL is expected. Additionally, URLs without any indication of a link to a website, may be considered unexpected.

At step 404 one or more of the systems described herein may determine, based on the hyperlink reference detected at step 402, whether a click contract describing a domain behavior associated with navigating to the website has been broken or fulfilled. For example, analysis module 106 may, as part of computing device 202 in FIG. 2, determine whether click contract 210 describes a domain behavior associated with navigating to a website 114 has been broken or fulfilled.

The term "click contract," as used herein, generally refers to any expected navigation resulting from a user click event on a URL in a web browser. For example, a click contract for a URL pointing to website "A" would be fulfilled when the landing destination resulting from clicking on the URL would result in a navigation to the website "A." Conversely, the click contract for the URL pointing to website "A" would be broken when the landing destination resulting from clicking on the URL would result in a navigation to a website "B." As another example, the click contract for the URL pointing to website "A" would also be broken when the landing destination resulting from clicking on the URL would result in a navigation to website "A" however, in the background (i.e., unbeknownst to the user), an intermediate redirection is also made to website "B" prior to the navigation landing at website "A." As another example, a click contract for a URL pointing to a hypertext transfer protocol secure (HTTPS) website would be fulfilled when the destination website is being served over HTTPS. Conversely, the click contract for the URL pointing to the HTTPS website would be broken when the destination website is being served over the nonsecure HTTP protocol. As another example, the click contract for the URL pointing to the HTTPS website would also be broken when the destination website is being served over HTTPS however, in the background (i.e., unbeknownst to the user), an intermediate redirection is also made to another website being served over the nonsecure HTTP protocol prior to the navigation landing at the destination website being served over HTTPS.

Analysis module 106 may determine whether click contract 210 has been broken or fulfilled in a variety of ways. In some embodiments, analysis module 106 may determine that click contract 210 has been broken when a navigation to a domain destination pointed to by the URL lands in a different domain destination in response to the user click event (e.g., the URL points to website "A" but the landing destination resulting from clicking on the URL results in a navigation to website "B"). Additionally or alternatively, analysis module 106 may determine that click contract 210 has been broken when a navigation to a domain destination is redirected to another domain destination prior to landing in the domain destination in response to a user click event 112 (e.g., the URL points to website "A" and the landing destination resulting from clicking on the URL results in a navigation to website "A" however, in the background, an intermediate redirection is also made to website "B" prior landing at website "A." Additionally or alternatively, analysis module 106 may determine that click contract 210 has been broken when a navigation to a domain destination protected by a secure protocol (e.g., HTTPS) lands in an unprotected (e.g., HTTP) domain destination in response to a user click event 112. Additionally or alternatively, analysis module 106 may determine that click contract 210 has been broken when a navigation to a domain destination protected by a secure protocol (e.g., HTTPS) is redirected to an unprotected (e.g., HTTP) domain destination prior to landing in the destination protected by the secure protocol in response to a user click event 112. In some embodiments, the URL pointing to the different and/or unprotected domain destinations in the broken click contract examples discussed above may be associated with web trackers (i.e., trackers 212).

At step 406 one or more of the systems described herein may identify the domain behavior as the expected domain behavior upon determining that the click contract has been fulfilled. For example, analysis module 106 may, as part of computing device 202 in FIG. 2, identify the domain behavior as expected domain behavior 116 upon determining that click contract 210 has been fulfilled.

Analysis module 106 may identify expected domain behavior 116 in a variety of ways. For example, as discussed above, analysis module 106 may identify expected domain behavior 116 when a URL pointing to website "A" results in a direct navigation (i.e., without redirection to a different intermediate destination) to the website "A" in response to receiving a user click event 112 on the URL. Additionally or alternatively, analysis module 106 may identify expected domain behavior 116 when a URL pointing to an HTTPS website results in a direct navigation (i.e., without redirection to an intermediate HTTP website) to the designated HTTPS website in response to receiving a user click event 112 on the URL.

At step 406 one or more of the systems described herein may identify the domain behavior as unexpected expected domain behavior upon determining that the click contract has been broken. For example, analysis module 106 may, as part of computing device 202 in FIG. 2, identify the domain behavior as unexpected domain behavior 214 upon determining that click contract 210 has been broken.

Analysis module 106 may identify expected domain behavior 116 in a variety of ways. For example, as discussed above, analysis module 106 may identify unexpected domain behavior 214 when a URL pointing to website "A" results in a direct navigation to a website "B" in response to receiving a user click event 112 on the URL. Additionally or alternatively, analysis module 106 may identify unexpected domain behavior 214 when a URL pointing to website "A" results in an indirect navigation to the website "A" (i.e., a redirection occurs to an intermediate destination at website "B") in response to receiving a user click event 112 on the URL. Additionally or alternatively, analysis module 106 may identify unexpected domain behavior 214 when a URL pointing to a secure HTTPS website results in a direct navigation to an unsecure HTTP website in response to receiving a user click event 112 on the URL. Additionally or alternatively, analysis module 106 may identify unexpected domain behavior 214 when a URL pointing to a secure HTTPS website results in an indirect navigation to a secure HTTPS (i.e., through an intermediate redirection to an unsecure HTTP website) in response to receiving a user click event 112 on the URL. In this example, the redirection to the unsecure HTTP website may result in secure user browser data being received as plain text and thus vulnerable to attack (e.g., a data breach).

Returning now to FIG. 3, at step 306 one or more of the systems described herein may determine, based on the analysis performed at step 304 (and described in detail in the description of FIG. 4), that the user click event deviates from the expected domain behavior associated with navigating to the website based on the URL. For example, determining module 108 may, as part of computing device 202 in FIG. 2, determine that a user click event 112 deviates from expected domain behavior 116 based on the identifying a click contract 210 that has been broken.

At step 308 one or more of the systems described herein may perform a security action that protects against potentially malicious activity caused by the user click event deviating from the expected domain behavior. For example, security module 110 may, as part of computing device 202 in FIG. 2, perform a security action that blocks website navigation (i.e., block website navigation action 216) for a user click event 112 on a URL that results in unexpected domain behavior 214.

Security module 110 may perform a security action that protects against potentially malicious activity caused by user click events 112 in a variety of ways. In some examples, security module 110 may perform block website navigation action 216 such that a current user click event 112 on the URL pointing to a website associated with unexpected domain behavior 214 will be blocked by the browser utilizing a browser extension. A user click event 112 may be blocked by intercepting the browser/navigation redirection following detection of a click on the URL. In some examples, security module 110 may perform block website navigation action 216 for all user click events 112 associated with unexpected domain behavior 214. In other examples, security module 110 may perform block website navigation 216 only for user click events 112 that are both associated with unexpected domain behavior 214 and that result in navigation to websites that do not appear on website domain whitelist 208. For example, website domain whitelist 208 may include a filtered list of highly accessed domains which have been determined to not appear any number of open-source harmful and/or high-risk domain lists. Thus, when it is determined that navigation to any domains in website domain whitelist 208 would result in a broken click contract 210, security module 110 would not perform block website navigation action 216 and the corresponding user click event 112 would be allowed. Additionally or alternatively, security module 110 may also generate a notification to the user that click contract 210 has been broken. Additionally or alternatively, security module 110 may present user security options in response to performing block website navigation action 216 for user selection. In some embodiments, these user security options may allow a user to bypass block website navigation action 216 such that future user click events 112 are allowed (e.g., when a blocked website is actually on a website a user wishes to access). In some examples, the user security options may include allowing subsequent user click events 112 on the URL to navigate to a website 114 during a web browsing session, trusting a domain associated with a website 114, and disabling a browser extension from detecting future user click events 112 on the URL.

Figure 5:
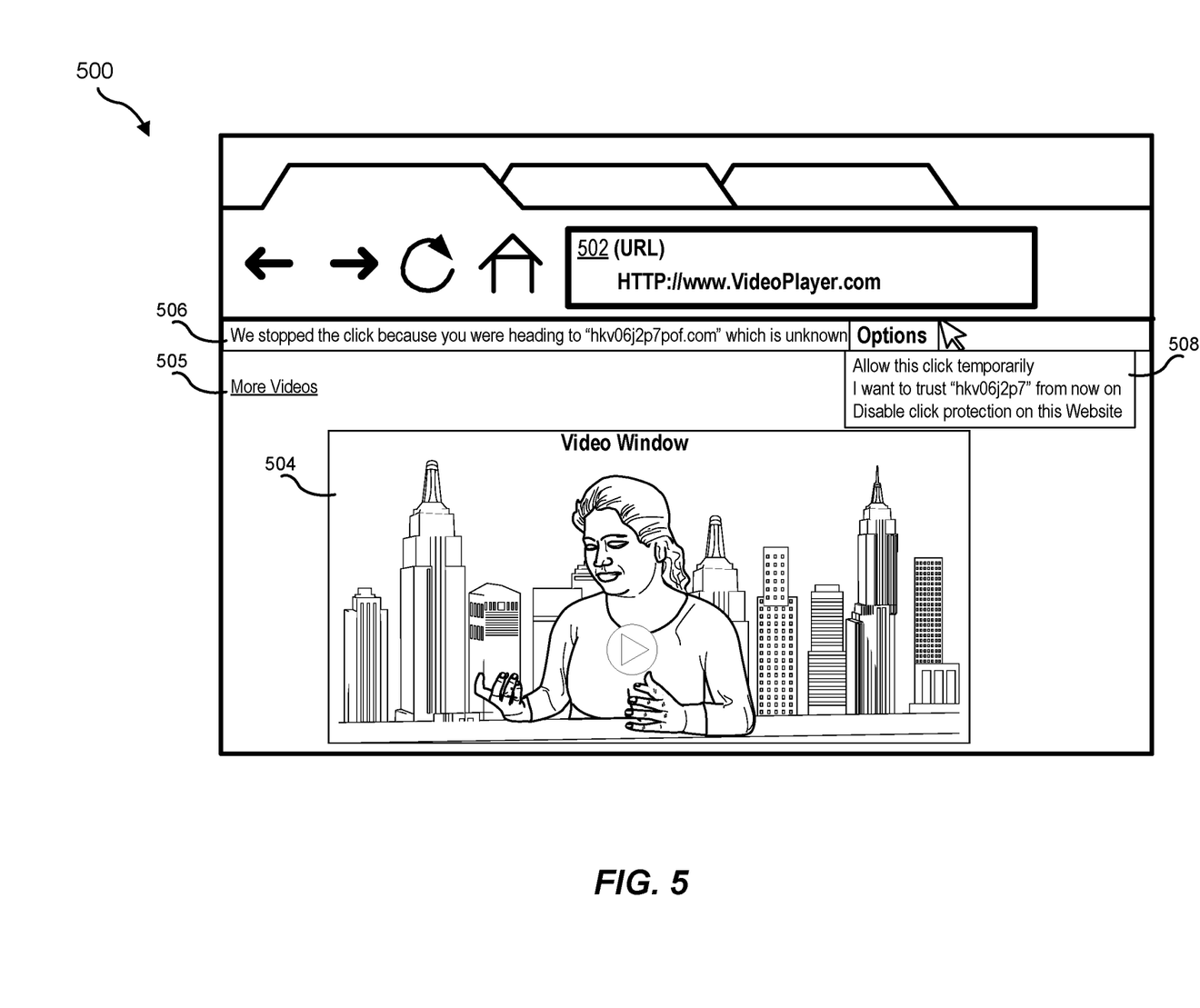
FIG. 5 is a block diagram of a website showing example security actions in an example system for protecting against misleading clicks.

FIG. 5 is a block diagram of a website 500 showing example security actions for protecting against misleading clicks. Website 500 includes a URL 502 identifying a currently displayed website for playing back a video stream 504. Website 500 further includes another URL 505 which is identified as a link for accessing additional video streams (i.e., "More Videos") for playback. Website 500 also includes a security action notification 506 indicating that a user click event on the URL 505 was stopped due to being identified as a misleading click because the landing destination pointed to by URL 505 (i.e., "hkv06j2p7") was determined to be unknown (i.e., the navigation URL 505 was determined to result in unexpected domain behavior). Website 500 also includes a dropdown box 508 for allowing a user to select additional options associated with security action notification 506 (e.g., in the event a user is aware that the landing destination for URL 505 is safe) including temporarily allowing the click event, trusting the unknown landing destination for URL 505, and/or displaying protection against misleading click events.

As explained in connection with method 300 above, the systems and methods described herein provide for utilizing a browser extension to monitor what occurs when a URL for navigating to a website is clicked in a browser to determine if a click contract corresponding to one or more rules of expected domain behavior has been broken. Upon determining a click contract has been broken based on unexpected domain behavior, the web browser extension may be configured to block the user click event by intercepting the browser navigation/redirection and notify the user that a click contract rule has been broken. By utilizing the browser extension in this way, the systems and methods described herein may inform and protect users from potentially unsecure, harmful, and/or tracking click events during web browsing sessions prior to landing on click destinations (e.g., websites) which may threaten user security or the security of user computing devices.

Figure 6:
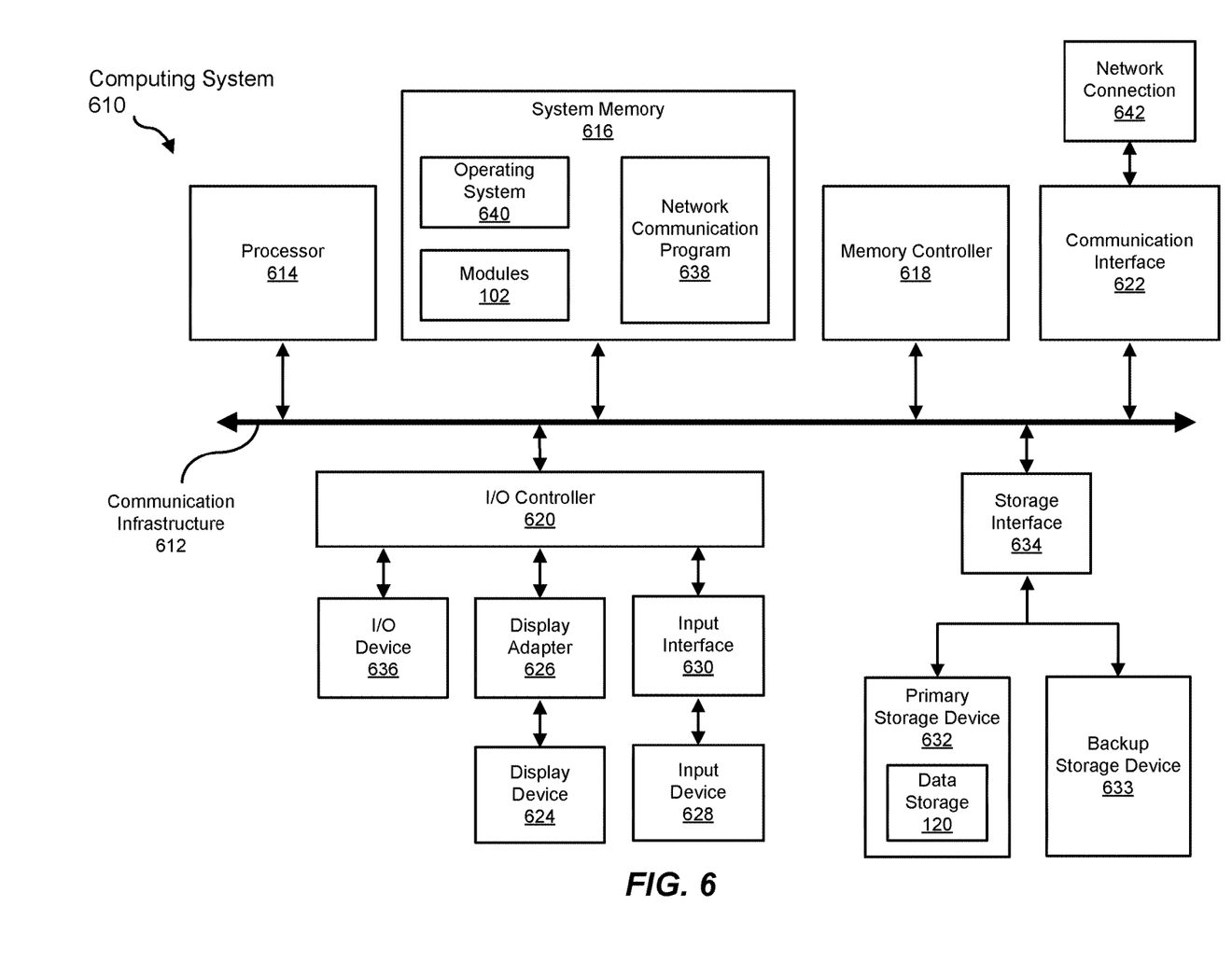
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
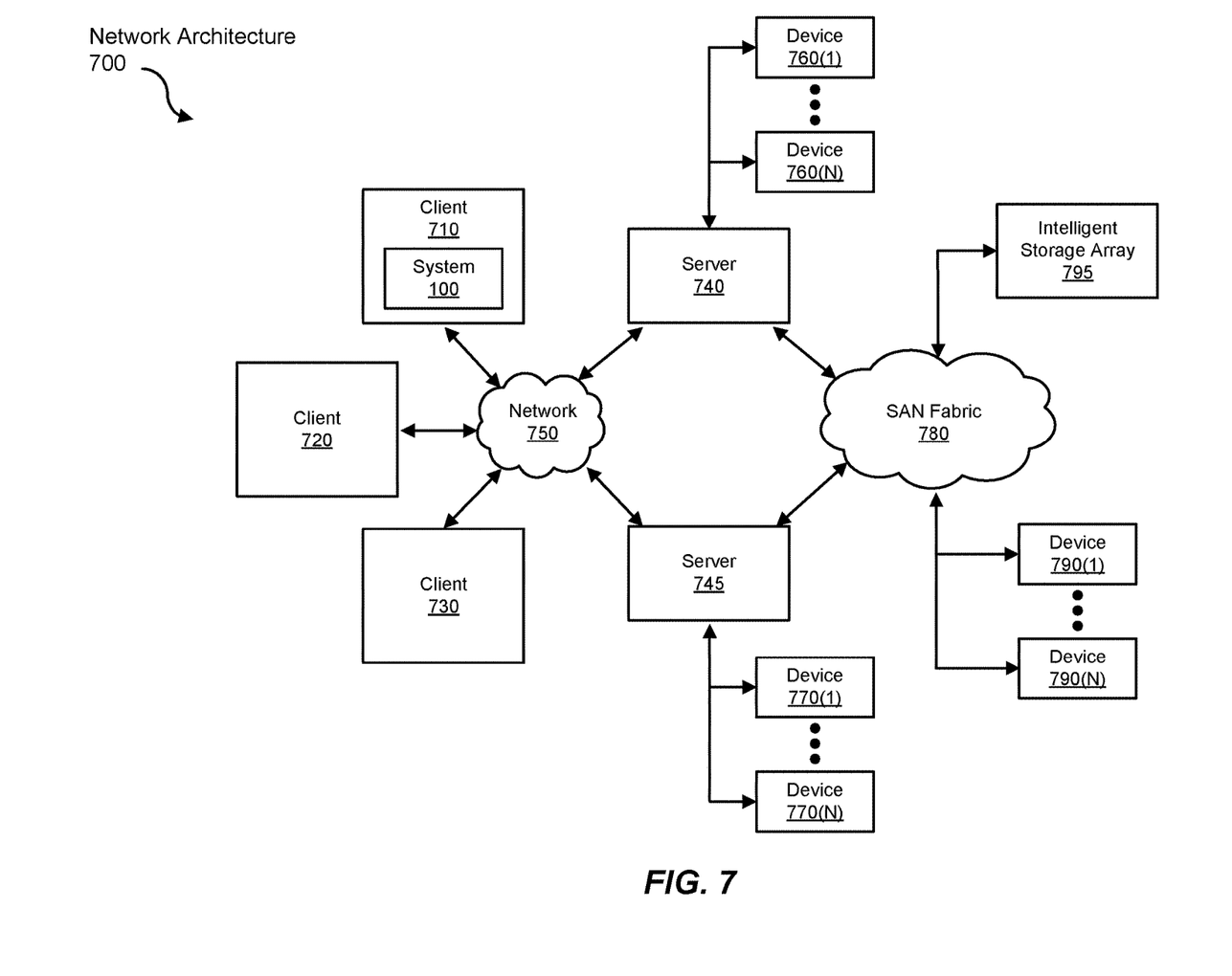
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for protecting against misleading clicks on websites.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting against misleading clicks on websites, at least a portion of the method being performed by one or more computing devices comprising at least one processor, the method comprising:

detecting, by the one or more computing devices, a user click event on a uniform resource locator (URL) for navigating to a website during a web browsing session;

analyzing, by the one or more computing devices, the user click event to identify expected domain behavior associated with navigating to the website based on the URL;

determining, by the one or more computing devices and based on the analysis, that the user click event deviates from the expected domain behavior associated with navigating to the website based on the URL; and performing, by the one or more computing devices, a security action that protects against potentially malicious activity caused by the user click event deviating from the expected domain behavior associated with navigating to the website based on the URL, wherein performing the security action comprises:

blocking the navigating to the website responsive to the user click event;

presenting a plurality of user security options in response to blocking the navigating to the website responsive to the user click event, wherein the plurality of the user security options comprises:

allowing subsequent user click events on the URL to navigate to the website during the web browsing session;

trusting a domain associated with the website; and disabling a browser extension utilized for detecting the user click event; and receiving a selection of at least one of the user security options.

2. The computer-implemented method of claim 1, wherein detecting the user click event on the URL for navigating to the website during the web browsing session comprises:
monitoring a website for the user click event during the web browsing session; and
extracting context information for the user click event.

3. The computer-implemented method of claim 2, wherein extracting the context information for the user click event comprises:
extracting information describing a domain where the user click event occurred; and
extracting an expected domain for a destination of the user click event.

4. The computer-implemented method of claim 1, wherein analyzing the user click event to identify the expected domain behavior associated with navigating to the website based on the URL comprises:
detecting a hyperlink reference to the URL in a browser for displaying the website during the browsing session;
determining, based on the hyperlink reference, whether a click contract describing a domain behavior associated with navigating to the website has been broken or fulfilled; and
identifying the domain behavior as the expected domain behavior upon determining that the click contract has been fulfilled.

5. The computer-implemented method of claim 4, wherein determining, based on the hyperlink reference, whether the click contract describing the domain behavior associated with navigating to the website based on the URL has been broken or fulfilled comprises at least one of:
determining that the click contract has been broken when a navigation to a target domain destination pointed to by the URL lands in a different domain destination in response to the user click event;
determining that the click contract has been broken when the navigation to the target domain destination is redirected to another domain destination prior to landing in the target domain destination in response to the user click event;
determining that the click contract has been broken when a navigation to a target domain destination protected by a secure protocol lands in an unprotected domain destination in response to the user click event; or
determining that the click contract has been broken when the navigation to the target domain destination protected by the secure protocol is redirected to the unprotected domain destination prior to landing in the target destination protected by the secure protocol in response to the user click event.

6. The computer-implemented method of claim 5, wherein the different domain destination comprises a web tracker domain.

7. The computer-implemented method of claim 5, wherein the another domain destination comprises a web tracker domain.

8. A system for protecting against misleading clicks on websites, the system comprising:
at least one physical processor;
physical memory comprising computer-executable instructions and one or more modules that, when executed by the physical processor, cause the physical processor to:
detect, by a detection module, a user click event on a uniform resource locator (URL) for navigating to a website during a web browsing session;
analyze, by an analysis module, the user click event to identify expected domain behavior associated with navigating to the website based on the URL;
determine, by a determining module and based on the analysis, that the user click event deviates from the expected domain behavior associated with navigating to the website based on the URL; and
perform, by a security module, a security action that protects against potentially malicious activity caused by the user click event deviating from the expected domain behavior associated with navigating to the website based on the URL, wherein the security module performs the security action by:
blocking the navigating to the website responsive to the user click event;
presenting a plurality of user security options in response to blocking the navigating to the website responsive to the user click event, wherein the plurality of the user security options comprises:
allowing subsequent user click events on the URL to navigate to the website during the web browsing session;
trusting a domain associated with the website; and
disabling a browser extension utilized for detecting the user click event; and
receiving a selection of at least one of the user security options.

9. The system of claim 8, wherein the detection module detects the user click event on the URL for navigating to the website during the web browsing session by:
monitoring a website for the user click event during the web browsing session; and
extracting context information for the user click event.

10. The system of claim 9, wherein the context information for the user click event is extracted by:
extracting information describing a domain where the user click event occurred; and
extracting an expected domain for a destination of the user click event.

11. The system of claim 8, wherein the analysis module analyzes the user click event to identify the expected domain behavior associated with navigating to the website based on the URL by:
detecting a hyperlink reference to the URL in a browser for displaying the website during the browsing session;
determining, based on the hyperlink reference, whether a click contract describing a domain behavior associated with navigating to the website has been broken or fulfilled; and
identifying the domain behavior as the expected domain behavior upon determining that the click contract has been fulfilled.

12. The system claim 11, wherein the broken or fulfilled click contract describing the domain behavior associated with navigating to the website based on the URL is determined by at least one of:
determining that the click contract has been broken when a navigation to a target domain destination pointed to by the URL lands in a different domain destination in response to the user click event;
determining that the click contract has been broken when the navigation to the target domain destination is redirected to another domain destination prior to landing in the target domain destination in response to the user click event;

determining that the click contract has been broken when a navigation to a target domain destination protected by a secure protocol lands in an unprotected domain destination in response to the user click event; or determining that the click contract has been broken when the navigation to the target domain destination protected by the secure protocol is redirected to the unprotected domain destination prior to landing in the target destination protected by the secure protocol in response to the user click event.

13. The system of claim 12, wherein the different domain destination comprises a web tracker domain.

14. The system of claim 12, wherein the another domain destination comprises a web tracker domain.

15. A non-transitory computer-readable medium comprising one or more computer-executable instructions that, when executed by at least one processor of a computing device, cause the computing device to:

detect a user click event on a uniform resource locator (URL) for navigating to a website during a web browsing session;

analyze the user click event to identify expected domain behavior associated with navigating to the website based on the URL;

determine, based on the analysis, that the user click event deviates from the expected domain behavior associated with navigating to the website based on the URL; and perform a security action that protects against potentially malicious activity caused by the user click event deviating from the expected domain behavior associated with navigating to the website based on the URL, wherein the security action is performed by:

blocking the navigating to the website responsive to the user click event;

presenting a plurality of user security options in response to blocking the navigating to the website responsive to the user click event, wherein the plurality of the user security options comprises:

allowing subsequent user click events on the URL to navigate to the website during the web browsing session;

trusting a domain associated with the website; and disabling a browser extension utilized for detecting the user click event; and receiving a selection of at least one of the user security options.

* * * * *